United States Patent
Blum

(10) Patent No.: US 8,160,160 B2
(45) Date of Patent: Apr. 17, 2012

(54) BIT-RATE REDUCTION FOR MULTIMEDIA DATA STREAMS

(75) Inventor: David Frederique Blum, Ness Ziona (IL)

(73) Assignee: Broadcast International, Inc., Salt Lake City, UT (US)

( * ) Notice: Subject to any disclaimer, the term of this patent is extended or adjusted under 35 U.S.C. 154(b) by 1622 days.

(21) Appl. No.: 11/518,298

(22) Filed: Sep. 8, 2006

(65) Prior Publication Data

US 2007/0058716 A1    Mar. 15, 2007

Related U.S. Application Data

(60) Provisional application No. 60/715,185, filed on Sep. 9, 2005.

(51) Int. Cl.
*H04N 7/18* (2006.01)
(52) U.S. Cl. .......... 375/240.29; 375/240.26; 375/240.21
(58) Field of Classification Search . 375/240.01–240.29
See application file for complete search history.

(56) References Cited

U.S. PATENT DOCUMENTS

| | | | |
|---|---|---|---|
| 5,481,297 A | 1/1996 | Cash et al. |
| 5,517,246 A | 5/1996 | Suzuki |
| 5,539,908 A | 7/1996 | Chen et al. |
| 5,596,659 A | 1/1997 | Normile et al. |
| 5,649,030 A | 7/1997 | Normile et al. |
| 5,684,714 A | 11/1997 | Yogeshwar et al. |
| 5,822,465 A | 10/1998 | Normile et al. |
| 6,002,720 A | 12/1999 | Yurt et al. |
| 6,031,939 A | 2/2000 | Gilbert et al. |
| 6,085,236 A | 7/2000 | Lea |
| 6,115,755 A | 9/2000 | Krishan |
| 6,157,965 A | 12/2000 | Mohammed et al. |
| 6,195,692 B1 | 2/2001 | Hsu |
| 6,212,302 B1 | 4/2001 | Honsinger et al. |
| 6,243,676 B1 | 6/2001 | Witteman |
| 6,252,544 B1 | 6/2001 | Hoffberg |

(Continued)

FOREIGN PATENT DOCUMENTS

EP    0889471 B1    6/2004

(Continued)

OTHER PUBLICATIONS

Office Action mailed Sep. 27, 2006, for U.S. Appl. No. 10/256,866, filed Sep. 26, 2002.

(Continued)

*Primary Examiner* — Andy Rao
(74) *Attorney, Agent, or Firm* — Kory D. Christensen; Stoel Rives LLP

(57) ABSTRACT

Systems and methods for reducing a bit-rate in a multimedia data stream while maintaining high image quality. Two consecutive frames of the multimedia data stream are spatially filtered, temporally filtered, and combined into a pre-processed frame. In one embodiment, the two consecutive frames are consecutive fields of an interlaced data stream that are deinterlaced by the spatial and temporal filtering process. The pre-processed frame is encoded multiple times using different quantization values to produce a plurality of encoded frames. One of the encoded frames is selected based on its image quality and/or size for inclusion in an encoded data stream. In one embodiment, the pre-processed frame undergoes a motion estimation method that performs an integer level search of overlapping locations around a co-located macroblock in a reference frame followed by a sub-pixel level diamond pattern search.

26 Claims, 11 Drawing Sheets

U.S. PATENT DOCUMENTS

| | | | |
|---|---|---|---|
| 6,349,151 B1 | 2/2002 | Jones et al. | |
| 6,356,545 B1 | 3/2002 | Vargo et al. | |
| 6,356,589 B1 | 3/2002 | Gebler et al. | |
| 6,356,668 B1 | 3/2002 | Honsinger et al. | |
| 6,421,726 B1 | 7/2002 | Kenner et al. | |
| 6,587,638 B1 | 7/2003 | Watanabe et al. | |
| 6,624,761 B2 | 9/2003 | Fallon | |
| 6,728,317 B1 * | 4/2004 | Demos | 375/240.21 |
| 6,968,006 B1 | 11/2005 | Puri et al. | |
| 7,130,472 B2 | 10/2006 | Iizuka et al. | |
| 2002/0062482 A1 | 5/2002 | Bolle et al. | |
| 2002/0097917 A1 | 7/2002 | Nelson et al. | |
| 2002/0141499 A1 | 10/2002 | Goertzen | |
| 2002/0172288 A1 | 11/2002 | Kwon | |
| 2003/0133501 A1 | 7/2003 | Ueda et al. | |
| 2004/0252759 A1 | 12/2004 | Winder et al. | |
| 2005/0163250 A1 | 7/2005 | McCallister | |
| 2007/0002946 A1 * | 1/2007 | Bouton et al. | 375/240.01 |

FOREIGN PATENT DOCUMENTS

| | | |
|---|---|---|
| WO | 9918728 A1 | 4/1999 |
| WO | 02087255 A2 | 10/2002 |

OTHER PUBLICATIONS

Office Action mailed Mar. 27, 2007, for U.S. Appl. No. 10/256,866, filed Sep. 26, 2002.

Ostman, Charles; Sentience on Demand, as an Online Commodity; 1997, 1998; www.biota.orgiostman/sent1htm;pp. 1-11.

Office Action mailed Jun. 21, 2007, for U.S. Appl. No. 10/784,397, filed Feb. 23, 2004.

Office Action mailed Sep. 27, 2006, for U.S. Appl. No. 10/256,866, filed Sep. 26, 2002.

* cited by examiner

BIT-RATE REDUCTION FOR MULTIMEDIA DATA STREAMS

RELATED APPLICATIONS

This application claims the benefit under 35 U.S.C. §119(e) of U.S. Provisional Patent Application No. 60/715,185, filed Sep. 9, 2005, which is hereby incorporated by reference herein in its entirety.

TECHNICAL FIELD

This disclosure relates generally to processing multimedia data streams. More specifically, the disclosure relates to reducing the bit-rate of a stream of data while achieving a very high quality resulting image or video.

BRIEF DESCRIPTION OF THE DRAWINGS

Non-limiting and non-exhaustive embodiments of the disclosure are described, including various embodiments of the disclosure with reference to the figures, in which.

DETAILED DESCRIPTION

Figure 1:
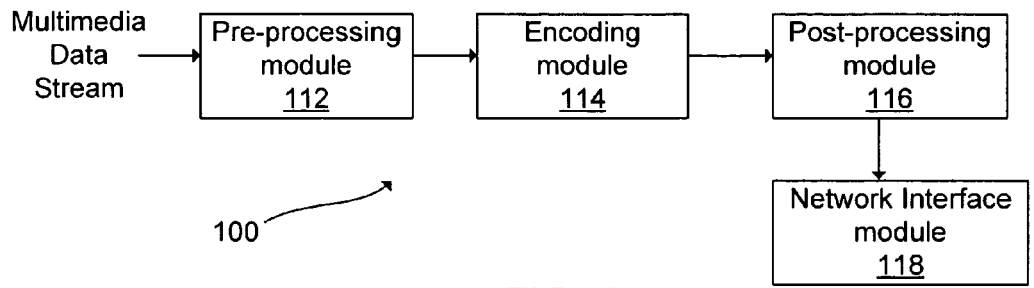
FIG. 1 is a block diagram of a system for reducing a bit rate of a multimedia data stream according to one embodiment.

When distributing video and still images, data compression is generally used to reduce costs (e.g., by reducing bandwidth). However, data compression introduces visual artifacts that reduce image quality. Therefore, according to certain embodiments disclosed herein, pre-encoding, de-interlacing, noise reduction, multi-scalar quantization, motion estimation, or combinations of the foregoing are performed on a stream of substantially real-time data, such as video streams, to achieve a high reduction in bit-rate with a very high quality resulting picture.

The embodiments of the disclosure will be best understood by reference to the drawings, wherein like elements are designated by like numerals throughout. In the following description, numerous specific details are provided for a thorough understanding of the embodiments described herein. However, those of skill in the art will recognize that one or more of the specific details may be omitted, or other methods, components, or materials may be used. In some cases, operations are not shown or described in detail.

Furthermore, the described features, operations, or characteristics may be combined in any suitable manner in one or more embodiments. It will also be readily understood that the order of the steps or actions of the methods described in connection with the embodiments disclosed may be changed as would be apparent to those skilled in the art. Thus, any order in the drawings or Detailed Description is for illustrative purposes only and is not meant to imply a required order, unless specified to require an order.

Embodiments may include various steps, which may be embodied in machine-executable instructions to be executed by a general-purpose or special-purpose computer (or other electronic device). Alternatively, the steps may be performed by hardware components that include specific logic for performing the steps or by a combination of hardware, software, and/or firmware.

Several aspects of the embodiments described will be illustrated as software modules or components. As used herein, a software module or component may include any type of computer instruction or computer executable code located within a memory device and/or transmitted as electronic signals over a system bus or wired or wireless network. A software module may, for instance, comprise one or more physical or logical blocks of computer instructions, which may be organized as a routine, program, object, component, data structure, etc., that performs one or more tasks or implements particular abstract data types.

In certain embodiments, a particular software module may comprise disparate instructions stored in different locations of a memory device, which together implement the described functionality of the module. Indeed, a module may comprise a single instruction or many instructions, and may be distributed over several different code segments, among different programs, and across several memory devices. Some embodiments may be practiced in a distributed computing environment where tasks are performed by a remote processing device linked through a communications network. In a distributed computing environment, software modules may be located in local and/or remote memory storage devices.

Overview

FIG. 1 is a block diagram of a system 100 for reducing a bit rate of a multimedia data stream 110 according to one embodiment. As discussed in detail below, the system 100 also provides deinterlacing of interlaced data streams. The system 100 includes a pre-processing module 112, an encoding module 114, a post-processing module 116, and a network interface module 118.

In one embodiment, the pre-processing module 112 and the post-processing module 116 may be used, for example, with pre-existing encoders to provide bit rate reduction, deinterlacing, quantization optimization, low computational motion estimation, and or noise reduction. In other embodiments, the pre-processing module 112, the encoding module 114, the post-processing module 116, and the network interface module 118 may be combined, for example, into a single codec to provide the functionality described herein.

The pre-processing module 112 is configured to reduce the number of bits in individual pictures or frames in the multimedia data stream 110. As discussed in detail below, the number of bits may be reduced by deleting or distorting portions (e.g., high frequency portions) of the frames without degrading (or with a reduced amount of degradation) the overall visual quality of the frame. In one embodiment, the pre-processing module 112 also provides spatial and/or temporal noise reduction.

The encoding module 114 is configured to provide coding and compression for the pre-processed multimedia data stream. The encoding module 114 may include, for example, an MPEG-2 encoder, an H.264 encoder, other conventional coding and compression encoders, and/or any non-conventional coding and compression encoder. In other words, certain embodiments disclosed herein do not depend on the type of encoding and compression used and are configured to improve the bit rate and quality of any type of encoding and compression.

In one embodiment, the encoding module 114 uses multiple encoders so as to encode a frame multiple times using different quantization values. In other embodiments, the encoding module 114 uses a single encoder to repeatedly encode a frame using different quantization values.

Whether using multiple encoders for each frame, or a single encoder multiple times for each frame, using multiple quantization values allows the post-processing module 116 to optimize quantization by selecting the smallest encoded frame that has the best picture quality. The post-processing module 116 then sends the selected encoded frame to the network interface module 118 where the selected frame is included in an output data stream for storage or transmission. An artisan will recognize from the disclosure herein that a single decoder can then be used to decode the output data stream for viewing.

Figure 2:
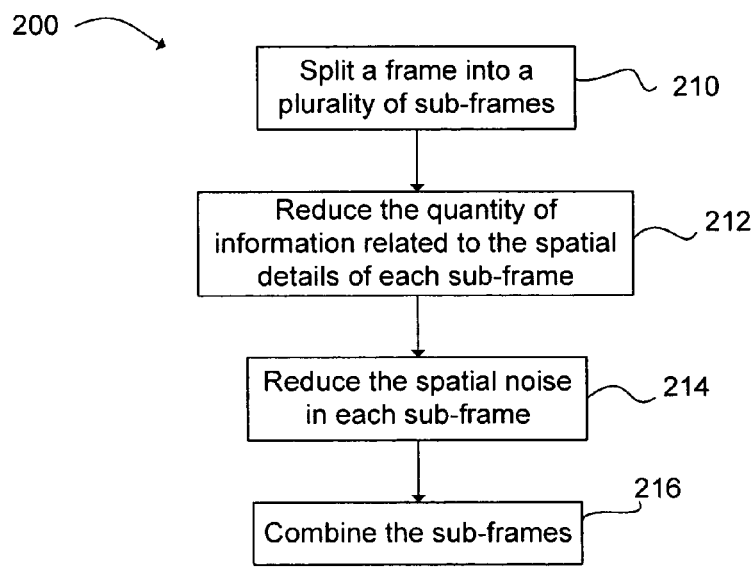
FIG. 2 is a flowchart of a method for removing data from a frame in a spatial domain according to one embodiment.

FIG. 2 is a flowchart of a method 200 for removing data from a frame in a spatial domain according to one embodiment. Removing high frequency data and noise in the spatial domain removes details that are less noticeable to the eye and produces a frame that can be encoded using less bits. Thus, the method 200 is usable by the pre-processing module 112 shown in FIG. 1 to prepare the multimedia stream 110 for encoding by the encoder module 114.

The method 200 includes splitting 210 the frame into a plurality of sub-frames for further processing. Each of the sub-frames includes a reduced portion of the data of the original frame. Splitting the frame allows smaller portions of the frame to be deleted or distorted so as to reduce overall frame degradation. If fewer sub-frames are used, the degradation in visual quality is more noticeable as compared to splitting the frame into more sub-frames. As discussed in detail below, in one embodiment, each frame is divided into nineteen sub-frames.

The method 200 also includes reducing 212 the quantity of information related to the spatial details of each sub-frame. The quantity of information may be reduced, for example, by filtering the sub-frames, replacing sample values of a sub-frame with an average sample value, replacing a portion of the sample values of a sub-frame with zeroes or another predetermined value, replacing a portion of the values of the sub-frame with a value approximately equal to half of a maximum sample value, or combinations of the foregoing.

The method 200 also includes reducing 214 spatial noise in each sub-frame. In one embodiment, the sample values of each sub-frame are transformed to the frequency domain and compared to a threshold frequency. The threshold frequency is selected such that removal of frequencies below the threshold frequency are less noticeable or are not noticeable to the eye. Each sub-frame is then filtered to remove noise. In one embodiment, the sub-frames are then filtered. The sub-frames are then combined 216 using interpolation to recreate a less detailed, but easier to encode, version of the original frame.

Figure 3:
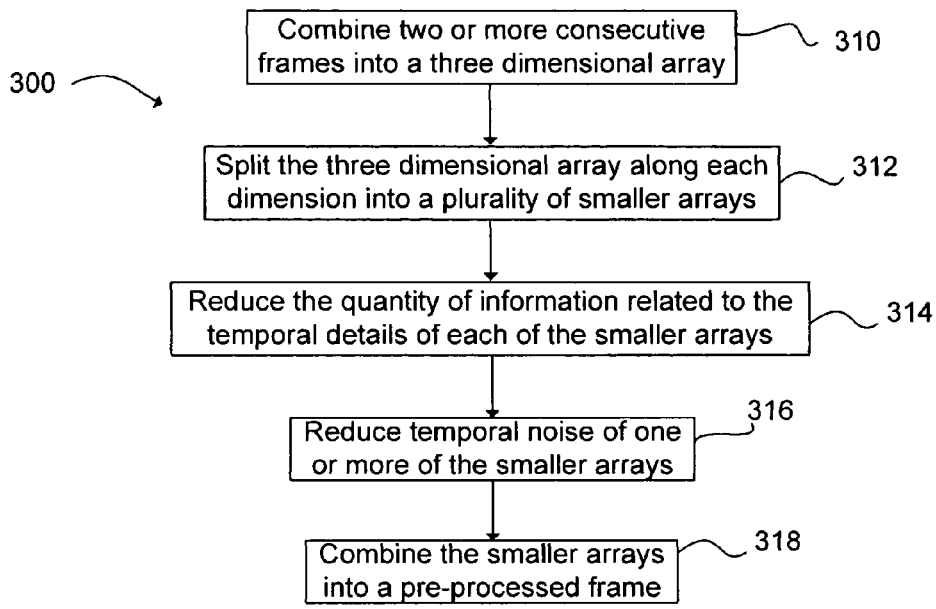
FIG. 3 is a flow chart of a method for removing data from frames in a temporal domain according to one embodiment.

FIG. 3 is a flow chart of a method 300 for removing data from frames in a temporal domain according to one embodiment. Removing high frequency data and noise in the temporal domain removes details that are less noticeable to the eye and produces frames that can be encoded using less bits. Thus, the method 300 is usable by the pre-processing module 112 shown in FIG. 1 to prepare the multimedia stream 110 for encoding by the encoder module 114. In one embodiment, the method 300 is used in combination with the method 200 shown in FIG. 2 to produce pre-processed frames that are spatially and temporally filtered to remove high frequency data and noise so that the frames can be encoded using less bits.

The method 300 includes combining 310 two or more consecutive frames into a three-dimensional array. Each individual frame in the array comprises two spatial dimensions (e.g., in the x and y directions of the three-dimensional array) and consecutive frames comprise a temporal dimension (e.g., in the z direction of the three-dimensional array). Processing in the temporal domain allows high frequency data and noise to be removed from the temporal domain.

In one embodiment, the two or more consecutive frames comprise two consecutive fields of an interlaced data stream. In addition to reducing temporal information and noise, as discussed below, the method 300 also combines the two consecutive fields into a single pre-processed frame. Thus, the method 300 is useful, in certain embodiments, for deinterlacing.

As shown in FIG. 3, the method 300 also includes splitting the three-dimensional array along each dimension into a plurality of sub-arrays. Each of the sub-arrays includes a reduced portion of the data of the original three-dimensional array. Splitting the three-dimensional array allows smaller portions of the array to be deleted or distorted so as to reduce overall image degradation.

In one embodiment where only two consecutive frames (or consecutive fields) are included in the three-dimensional array, decimating the three-dimensional array by two along the temporal dimension creates two-dimensional arrays. In certain embodiments where more than two consecutive frames (or consecutive fields) are used, decimation in the temporal dimension is performed several times or using a higher decimation factor (e.g., decimation by three, decimation by four, etc.) so as to create a plurality of two-dimensional arrays. In such embodiments, two-dimensional arrays are used because they allow data processing that is less complicated. For example, two-dimensional Wiener filters and/or two-dimensional discrete cosine transforms can be used.

The method 300 also includes reducing 314 the quantity of information related to the temporal details of each of the sub-arrays. The quantity of information may be reduced, for example, by filtering, replacing sample values with an average sample value, replacing a portion of the sample values with zeroes or another predetermined value, replacing a portion of the values with a value approximately equal to half of a maximum sample value, or combinations of the foregoing.

The method 300 also includes reducing 316 temporal noise in one or more of the sub-arrays. In one embodiment, temporal noise is reduced by passing one or more of the sub-arrays through a noise reducing filter, such as a Weiner filter. Other smaller arrays may also be transformed to the frequency domain and compared to a threshold frequency. The threshold frequency is selected such that removal of frequencies below the threshold frequency are less noticeable or are not noticeable to the eye. The sub-arrays are then combined 318 using interpolation into a single pre-processed frame. The pre-processed frame is a combination of less detailed versions of the original frames included in the three dimensional array. Thus, the pre-processed frame can be encoded using less bits.

Figure 4:
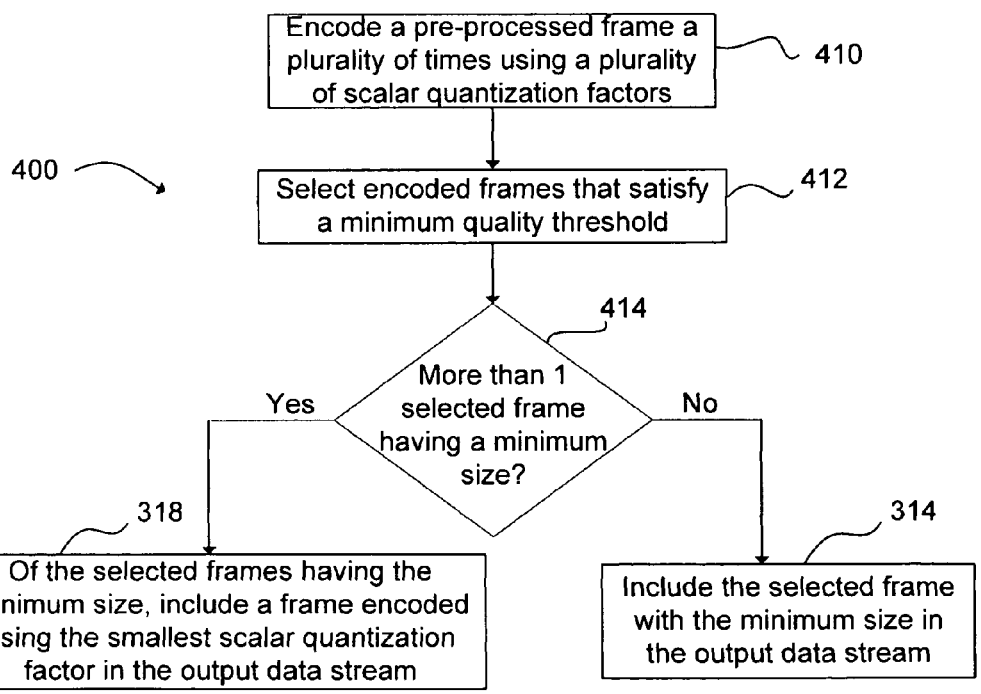
FIG. 4 is a flowchart of a method for finding optimum scalar quantization according to one embodiment.

FIG. 4 is a flowchart of a method 400 for finding optimum scalar quantization according to one embodiment. The method 400 is usable by the post-processing module 116 shown in FIG. 1. The method 400 includes encoding 400 a pre-processed frame a plurality of times using a plurality of scalar quantization factors. In some embodiments, matrix quantization may also be used. However, in certain embodiments it is desirable to use quantization in a uniform way. Thus, in such embodiments, scalar quantization is used.

The method 400 also includes selecting 412 encoded frames that satisfy a minimum quality threshold. In one embodiment, the method 400 determines a peak signal-to-noise ratio (PSNR) score for each of the encoded frames and compares the PSNR scores to a threshold value. The PSNR scores provide an indication of picture quality. The method 400 selects encoded frames with PSNR scores greater than the threshold value.

To reduce bit rate, the smallest of the selected frames is included in an output data stream. Thus, the method 400 also includes querying 414 whether more than one selected frame has a minimum size. If only one selected frame has the minimum size (e.g., one selected frame is smaller than the other selected frames), then the selected frame with the minimum size is included 416 in the output data stream. If, on the other hand, two or more of the selected frames have the minimum size, then the frame encoded using the smallest scalar quantization factor is included 418 in the output data stream. Using a larger quantization factor increases image artifacts when the image is decoded, usually in the form of "mosaicing." Thus, selecting the frame encoded using the smallest quantization factor increases image quality.

Exemplary System Embodiment

Figure 5:
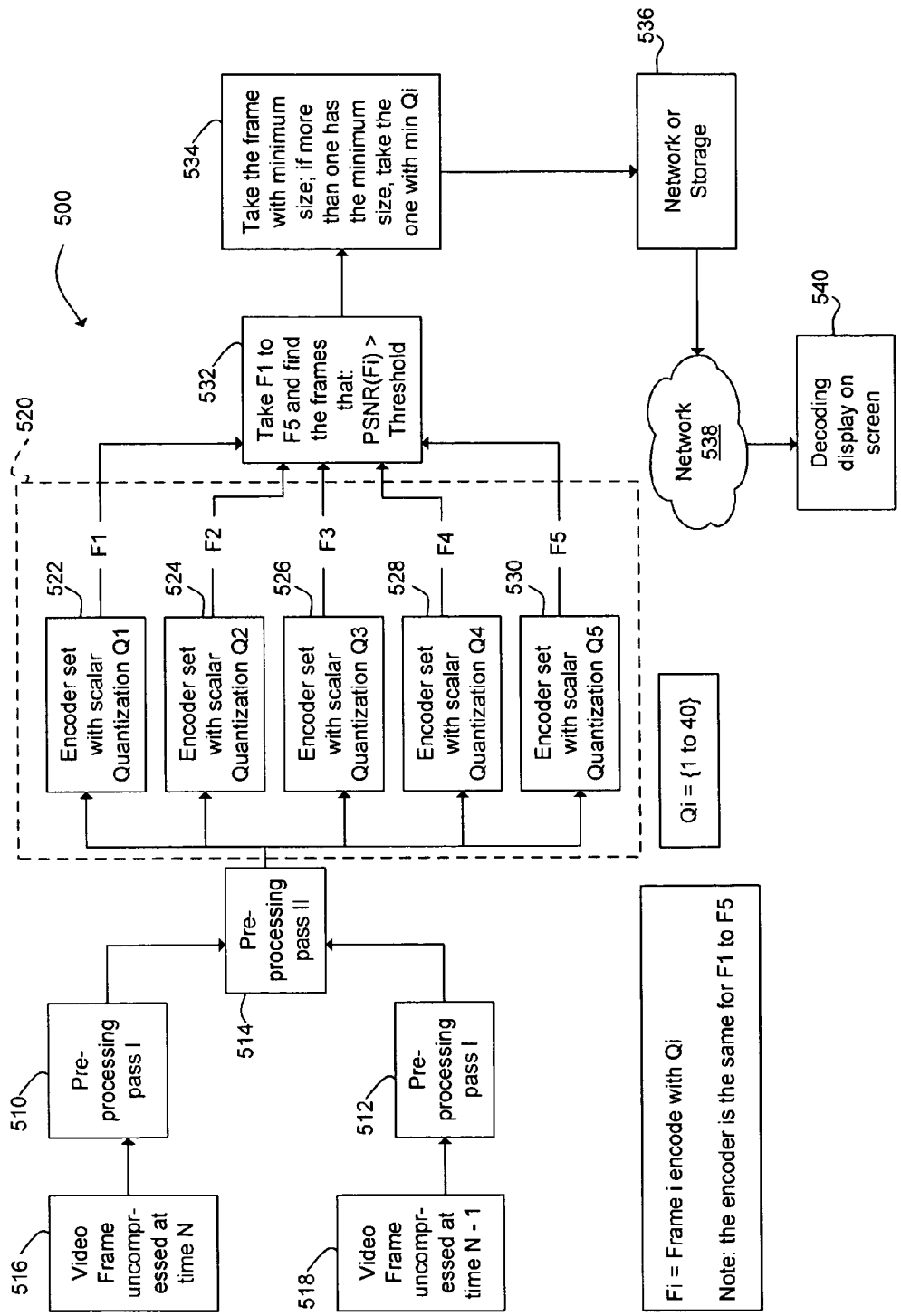
FIG. 5 is a block diagram of an exemplary system according to one embodiment.

FIG. 5 is a block diagram of an exemplary system 500 according to one embodiment. The system 500 is configured to reduce a multimedia data stream's bit rate by up to 70% and, in some embodiments, perform de-interlacing. In certain embodiments, the system 500 also finds an optimum scalar quantization, provides a very low computational motion estimation, and provides robust noise reduction in both the spatial domain and the temporal domain. Portions of the system 500 may be used alone, for pre-processing as described below, or for post-processing. For example, pre-processing pass I modules 510, 512 (described in detail in FIGS. 6A-7B) and pre-processing pass II module 514 (described in detail in FIGS. 8A-8C) may be used for post-processing, as will be made apparent to those skilled in the art from the disclosure herein.

By way of example, and not by limitation, the system 500 may provide encoding and compression at a bit rate of approximately 1.600 Mbps for an audio/video data stream having a resolution of 1280×720 pixels at 60 frames/second with progressive scanning. Under such conditions, the system 500 provides a very high quality picture. As another example, the system 500 also provides a very high quality picture when encoding and compressing at a bit rate of approximately 90 Kbps for an audio/video data stream having a resolution of 320×240 pixels at 24 frames/second with progressive scanning. An artisan will recognize from the disclosure herein that these specific examples are for illustrative purposes only and that the system 500 can be used to compress any size frame at various bit rates.

The pre-processing pass I modules 510, 512 receive consecutive uncompressed video frames. As shown in FIG. 5, the pre-processing pass I module 510 receives an uncompressed video frame 516 at time N and the pre-processing pass I module 512 receives an uncompressed video frame 518 at time N−1. Thus, two consecutive frames can be pre-processed in parallel. In one embodiment, the pre-processing pass I modules 510, 512 perform the same operations as one another, except they receive frames at different times (N and N−1, respectively).

As discussed below, processing two consecutive video frames 516, 518 in parallel allows the video frames 516, 518 to eventually be filtered in the temporal domain. Further, in one embodiment, the pre-processing pass I modules 510, 512 receive consecutive fields of an interlaced data stream so that the fields can be deinterlaced into a single frame. Thus, the system 500 advantageously provides deinterlacing.

The pre-processing pass I modules 510, 512 are configured to delete high frequency data in the spatial domain. As discussed below in relation to FIGS. 6A-7B, the pre-processing pass I modules 510, 512 split their respective frames 516, 518 into nineteen different sub-frames that each include specific portions of the original frames 516, 518. The pre-processing pass I modules 510, 512 delete or distort some parts of the nineteen different pictures without degrading the quality of the original frames 516, 518 so as to permit reduced bit-rates when the frames 516, 518 are encoded.

An artisan will recognize from the disclosure herein that the frames 516, 518 can each be split into a different number of sub-frames and that nineteen sub-frames are used by way of example only. Using a large number of sub-frames reduces the amount of distortion that the human eye perceives when viewing the final video images. Six sub-frames, for example, could also be used and would result in a lower quality reconstructed image, as compared to using nineteen sub-frames. However, in certain conditions, the lower image quality resulting from using six sub-frames instead of nineteen sub-frames may be acceptable. Thus, less or more than nineteen different sub-images can be used.

The outputs of the pre-processing pass I modules 510, 512 are provided to the pre-processing pass II module 514, which further processes the frames 516, 518 in the temporal dimension so as to reduce variations between the two consecutive frames 516, 518 without disturbing the naturalness of the motion. As discussed below in relation to FIGS. 8A-8C, the outputs of the pre-processing pass I modules 510, 512 according to one embodiment are used to fill a three-dimensional array of two buffers. The three-dimensional array is denoted in FIG. 8A as having dimensions x, y, and z (which may correspond, for example, to horizontal, vertical and temporal dimensions, respectively).

In one embodiment, the pre-processing pass II module 514 splits the three-dimensional array into eight different pictures (or sub-arrays) for each buffer. Because there are two buffers in this embodiment, the three-dimensional array is split into sixteen different pictures. The pre-processing pass II module 514 deletes or distorts some parts of the sixteen different pictures without degrading the quality of the original pictures so as to permit reduced bit-rates during encoding.

An artisan will recognize from the disclosure herein that the three-dimensional array can be split into a different number of pictures and that sixteen pictures is used by way of example only. Using a large number of pictures reduces the amount of distortion that the human eye perceives when viewing the final video images. Six pictures, for example, could also be used and would result in a lower quality reconstructed image, as compared to using sixteen pictures. However, in certain conditions, the lower image quality resulting from using six pictures instead of sixteen pictures may be acceptable. Thus, less or more than sixteen different pictures can be used.

The pre-processing pass II module 514 provides a pre-processed frame (filtered in both the spatial dimension and the temporal dimension) to a codec 520. The codec 520 includes a plurality of encoders 522, 524, 526, 528, 530 that each provide the same type of encoding to the pre-processed frame, but with different scalar quantization.

An artisan will recognize from the disclosure herein that any number of encoders can be used and that the five encoders 522, 524, 526, 528, 530 shown in FIG. 5 are provided by way of example only. The encoders 522, 524, 526, 528, 530 are used to find the optimal factor of scalar quantization. If fewer encoders are used, the system 500 will find a less optimal factor of scalar quantization. Further if more encoders are used, the system 500 will find a more optimal factor of scalar quantization. An artisan will also recognize from the disclosure herein that in other embodiments the codec 520 may include a single encoder through which the pre-processed frame is passed multiple times (e.g., from a buffer) using different scalar quantization factors.

In one embodiment, the codec 520 disables rate control for each of the encoders 522, 524, 526, 528, 530. Rate control in an encoder is generally not sensitive enough to different variations of the real amount of bits in the picture. Thus, rate control is disabled. In one embodiment where the codec 520 disables rate control, standard rate control in the sense of a video buffer verifier (VBV) provides an indication of the size of the encoded frames. In addition, or in another embodiment, the encoders 522, 524, 526, 528, 530 are very sensitive to any variation of the amount of bit in the picture to be encoded. This sensitivity provides a constant quality and the best quality that is possible for a specific encoded size frame. Using two or more scalar quantization factors provides the same size encoded frame and the lower quantization factor provides the best quality.

The encoders 522, 524, 526, 528, 530 may include, for example, an MPEG-4 encoder having a scalar quantization method. As another example, the encoders 522, 524, 526, 528, 530 may include an H.264 encoder having a scalar quantization method. While matrix quantization may be used in some embodiments, scalar quantization allows the system 500 to quantize in a uniform way that cooperates well with the pre-processing pass I modules 510, 512 and the pre-processing pass II module 514.

The codec 520 outputs encoded frames F1, F2, F3, F4, F5, wherein Fi corresponds to frame i encoded with quantization factor Qi. In one embodiment, the quantization factor Qi is selected from a set of values ranging from 1 to 40. The encoded frames F1, F2, F3, F4, F5 are provided to an image quality module 532. Each output from the encoders includes a PSNR score that defines the similarity of the compressed frame from the original frame.

The image quality module 532 compares each PSNR score with a threshold value. The threshold value may be statistically determined so as to provide an acceptable or desired image quality. In one embodiment, the threshold is modified according to a desired bit rate. The image quality module 532 selects those encoded frames F1, F2, F3, F4, F5 having PSNR scores greater than the threshold. If none of the frames F1, F2, F3, F4, F5 are greater than the threshold, then the image quality module 532 selects the two frames that have highest PSNR score. Thus, the image quality module 532 is configured to find the frames that have the best quality.

The frames selected by the image quality module 532 are passed to an output selection module 534. The output selection module 534 selects the smallest frame of those frames selected by the image quality module 532. If more than one of the frames has the minimum size, then the output selection module 534 selects the frame with the smallest quantization factor Qi. Larger quantization factors increase image artifacts when the stream is decoded. Thus, the output selection module 534 selects the frame encoded with the minimum quantization factor Qi.

The output selection module 534 then sends the selected frame to a network or storage device 536. The above process is repeated for each frame in the multimedia data stream (or field in an interlaced data stream). The resulting output data stream may be saved to, for example, a hard drive, a floppy drive, a solid-state memory device, a magnetic memory device, a CD-ROM, a DVD-ROM, or other memory device. The output data stream may also be transmitted or broadcast through a network 538 to a codec 540 where it can be decoded for display on a screen. An artisan will recognize from the disclosure herein that the codec 540 need only have a single decoder to decode the output data stream.

The network 538 may include, for example, the Internet or World Wide Web, an intranet such as a local area network (LAN) or a wide area network (WAN), a public switched telephone network (PSTN), or any other network of communicating computerized devices. The network 538 may also include a broadcast network such as a cable television network or a satellite television network.

Spatial Pre-Processing

FIGS. 6A-7B are block diagrams illustrating the pre-processing pass I module 510 shown in FIG. 5 according to one embodiment. As discussed above, the pre-processing pass I module 510 is configured to delete high frequency data in the spatial domain. As also discussed above, the pre-processing pass I module 510 is substantially the same as the pre-processing pass I module 512. Thus, FIGS. 6A-7B are also applicable to the pre-processing pass I module 512.

Figure 6A:
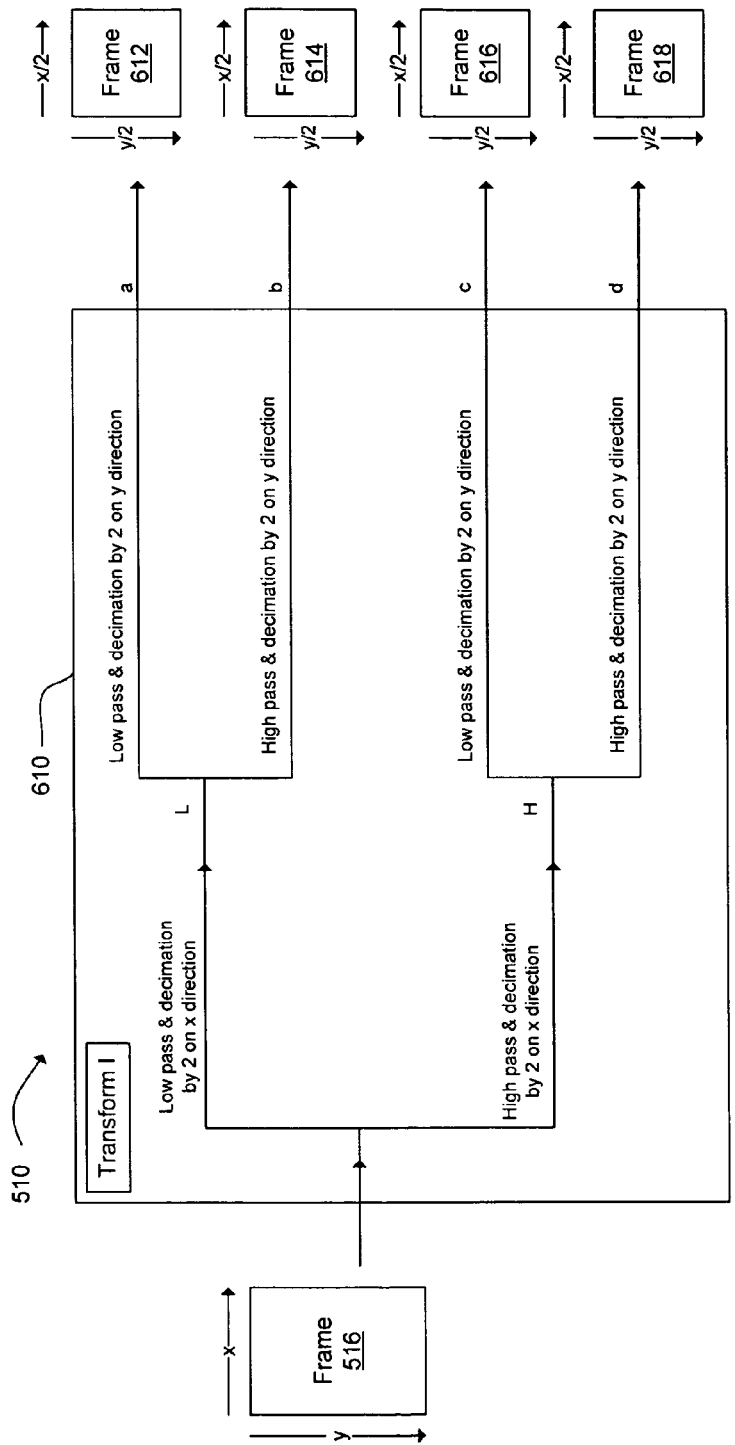
FIG. 6A is a block diagram of a first transform for splitting a frame into a plurality of sub-frames according to one embodiment.
Figure 7A:
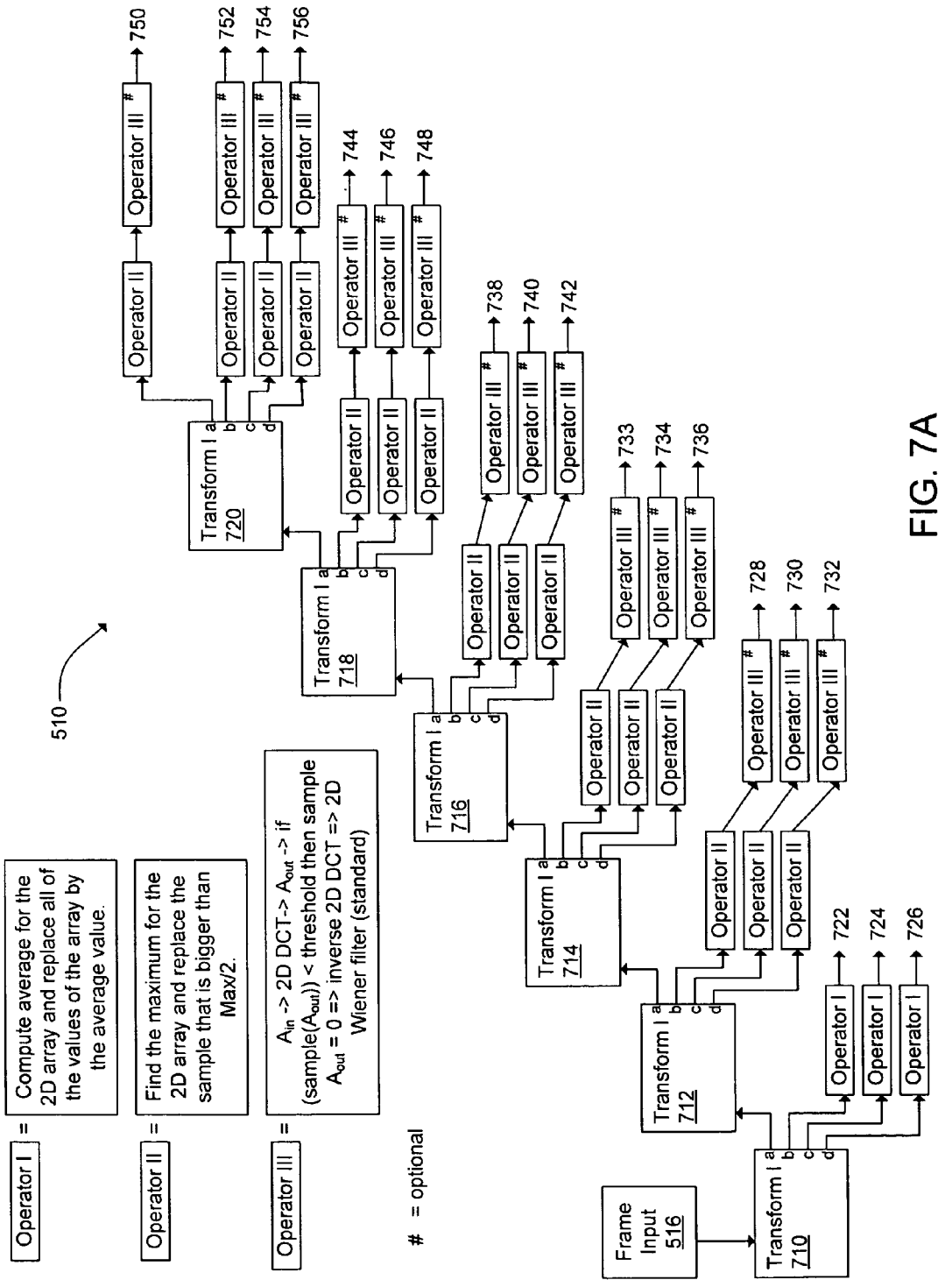
FIGS. 7A-7B are block diagrams of a pre-processing pass I module shown in FIG. 5 according to one embodiment.

FIG. 6A is a block diagram of a first transform 610 for splitting the frame 516 into a plurality of sub-frames 612, 614, 616, 618. As shown in FIG. 7A, the first transform 610 is used in one embodiment to split the frame 516 into nineteen sub-frames. The first transform 610 filters each row of the original image (frame 516) with a low pass filter and a high pass filter. The coefficients of the low pass filter and the high pass filter according to one embodiment are shown in FIG. 6A. An artisan will recognize that these coefficients are shown by way of example only, and not by limitation.

The output of each filter is down-sampled (e.g., decimated) by a factor of two to produce two intermediate images, shown as "L" and "H." The intermediate image L is the original image low-pass filtered and down-sampled in the x-direction. The intermediate image H is the original image high-pass filtered and down-sampled in the x-direction.

Each column of the intermediate images L, H is also filtered with low pass and high pass filters and down-sampled by a factor of two to produce four sub-frames, shown as a, b, c, d. The sub-frames a, b, c, d may also be referred to as "subband" images and can be combined to create an output image with the same number of samples as the original image using, for example, a second transform 620 as shown in FIG. 6B.

Figure 6B:
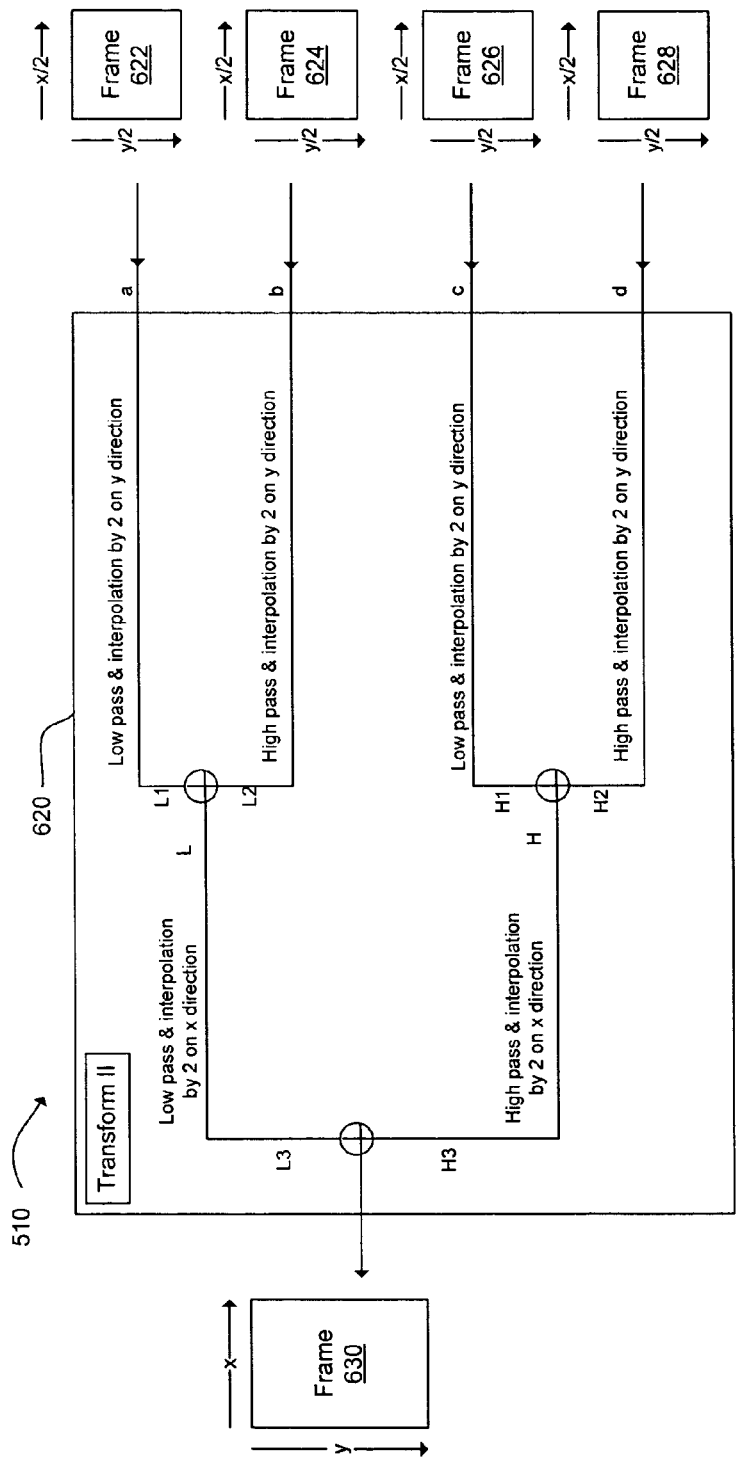
FIG. 6B is a block diagram of a second transform for combining a plurality of sub-frames according to one embodiment.
Figure 7B:
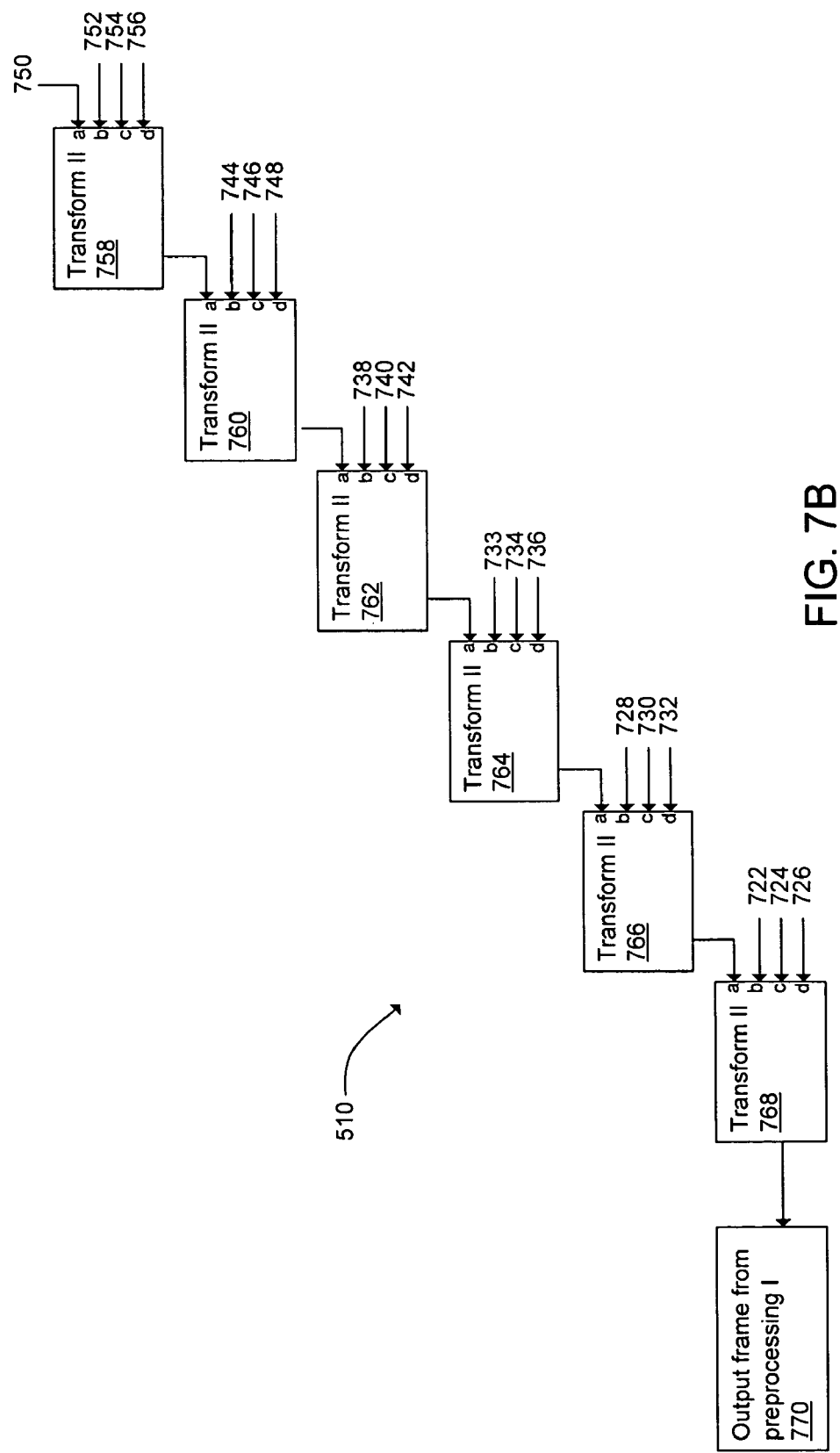

FIG. 6B is a block diagram of a second transform 620 for combining a plurality of sub-frames 622, 624, 626, 628. As shown in FIG. 7B, the second transform 620 is used to combine nineteen sub-frames into an output frame. The second transform 620 filters each row of the sub-frame 622 with a low pass filter (again, the coefficients of the low pass filters and high pass filters are shown in FIG. 6B as an example) and up-samples (e.g., interpolates) the filter's output by a factor of two to produce intermediate image L1. The second transform 620 also filters each row of the sub-frame 624 with a high pass filter and up-samples the filter's output by a factor of two to produce intermediate image L2. The second transform adds the intermediate images L1 and L2 to produce intermediate image L.

The second transform 620 filters each row of the sub-frame 626 with a low pass filter and up-samples the filter's output by a factor of two to produce intermediate image H1. The second transform 620 also filters each row of the sub-frame 628 with a high pass filter and up-samples the filter's output by a factor of two to produce intermediate image H2. The second transform 620 then adds the intermediate images H1 and H2 to produce intermediate image H.

The second transform 620 then filters the intermediate image L with a low pass filter and up-samples the filter's output by a factor of two to produce intermediate image L3. The second transform 620 also filters the intermediate image H with a high pass filter and up-samples the filter's output by a factor of two to produce intermediate image H3. The second transform 620 then adds the intermediate transforms L3 and H3 to produce a frame 630.

FIGS. 7A-7B are block diagrams of the pre-processing pass I module 510. Referring to FIG. 7A, the pre-processing pass I module 510 splits the frame 516 several times using first transforms 710, 712, 714, 716, 718, 720. In one embodiment, the first transforms 710, 712, 714, 716, 718, 720 each comprise the first transform 610 shown in FIG. 6A. Thus, each of the first transforms 710, 712, 714, 716, 718, 720 has one input and four outputs (labeled a, b, c, d) that are each a quarter of the size of its respective input.

From the first transform 710, the output a is passed to the first transform 712 and the outputs b, c and d are passed to Operator I modules (discussed below) to produce sub-frames 722, 724, 726, respectively.

From the first transform 712, the output a is passed to the first transform 714, and the outputs b, c and d are passed to Operator II modules (discussed below) and, in certain embodiments, to Operator III modules (discussed below) to produce sub-frames 728, 730, 732, respectively.

From the first transform 714, the output a is passed to the first transform 716, and the outputs b, c and d are passed to the Operator II modules and, in certain embodiments, to the Operator III modules to produce sub-frames 733, 734, 736, respectively.

From the first transform 716, the output a is passed to the first transform 718, and the outputs b, c and d are passed to the Operator II modules and, in certain embodiments, to the Operator III modules to produce sub-frames 738, 740, 742, respectively.

From the first transform 718, the output a is passed to the first transform 720, and the outputs b, c and d are passed to the Operator II modules and, in certain embodiments, to the Operator III modules to produce sub-frames 744, 746, 748, respectively.

From the first transform 720, the outputs a, b, c and d are passed to the Operator II modules and, in certain embodiments, to the Operator III modules to produce sub-frames 750, 752, 754, 756, respectively. Thus, the parts of the low pass filter in the x and y directions are successively passed along the first transforms 710, 712, 714, 716, 718, 720 and the parts that include components of the high pass filter are passed to the Operator I modules, the Operator II modules and/or the Operator III modules (see FIG. 6A).

Referring to FIG. 7B, the pre-processing pass I module 510 then combines the sub-frames 722, 724, 726, 728, 730, 732, 733, 734, 736, 738, 740, 742, 744, 746, 748, 750, 752, 754, 756 using second transforms 758, 760, 762, 764, 766, 768 to produce output frame 770. In one embodiment, the second transforms 758, 760, 762, 764, 766, 768 each comprise the second transform 620 shown in FIG. 6B. Thus, each of the second transforms 758, 760, 762, 764, 766, 768 has four inputs (labeled a, b, c and d) and one output that is four times larger than each input.

The sub-frames 750, 752, 754, 756 are passed to inputs a, b, c and d of the second transform 758. The output of the second transform 758 is passed to input a of the second transform 760 and the sub-frames 744, 746, 748 are passed to inputs b, c and d of the second transform 760. The output of the second transform 760 is passed to input a of the second transform 762 and the sub-frames 738, 740, 742 are passed to inputs b, c and d of the second transform 762.

The output of the second transform 762 is passed to input a of the second transform 764 and the sub-frames 733, 734, 736 are passed to inputs b, c and d of the second transform 764. The output of the second transform 764 is passed to input a of the second transform 766 and the sub-frames 728, 730, 732 are passed to inputs b, c and d of the second transform 766.

The output of the second transform 766 is passed to input a of the second transform 768 and the sub-frames 722, 724, 726 are passed to inputs b, c and d of the second transform 768. The output of the second transform 768 is an output frame 770 of the pre-processing pass I module 510. The output frame 770 is provided to the pre-processing pass II module 514 along with the output of the pre-processing pass I module 512.

As shown in FIG. 7A, the Operator I modules calculate the average value of their respective two-dimensional input arrays and replace all of the values in their respective input arrays with the respective average values. This permits the second transform 762 (shown in FIG. 7B) to provide a best or good reconstruction of data because the average value allows a best or good interpolation of a DC part that arrives from the output of the second transform 766.

Thus, the pre-processing pass I module 510 uses the Operator I modules to save the part of the low pass filter in the x and y directions and to receive from the other frequency (e.g., the sub-frames 722, 724, 726) an average value that permits a best or good interpolation. In other words, the second transform 768 receives three inputs (e.g., the sub-frames 722, 724, 726) with average values that permit the second transform 768 to arrive at a good interpolation.

In another embodiment, the Operator I modules replace all of their respective input array values with a zero value, for example, instead of an average value. However, such an embodiment produces a lower picture quality than replacing the respective input array values with the respective average values.

As shown in FIG. 7A, the Operator II modules find the maximum values of their respective two-dimensional input arrays and replace the sample values that are greater than half the respective maximum (max/2) values with the respective max/2 values. Thus, the Operator II modules reduce the quantity of information related to the details of the original picture. Cutting (e.g., replacing high sample values) allows the interpolation stages (e.g., the second transforms 758, 760, 762, 764, 766) to receive some details of the pictures while attempting to round the edges.

The Operator III modules provide noise reduction. One reason the pre-processing pass I module 510 creates and processes small pictures (e.g., sub-frames) is that the noise reduction provided by the Operator III modules usually creates artifacts that can be substantially repaired when the second transforms 758, 760, 762, 764, 766 interpolate the small pictures.

As shown in FIG. 7A, the Operator III modules take the two-dimensional discrete cosine transform (2D DCT) of their respective two-dimensional input arrays. Taking the discrete cosine transform transforms the input arrays to the frequency domain so their sample values can be compared to a frequency threshold. Sample values that are less than the frequency threshold are removed (e.g., set equal to zero). The Operator III modules then take the inverse two-dimensional discrete cosine transform and pass the results through a two-dimensional Wiener filter to reduce noise.

Thus, each stage of the pre-processing pass I module 510 is configured to save a part of the original pictures (the DC part) and to destroy other parts of the pictures to produce a new picture with less details but being easier to encode (e.g., using less bits).

Temporal Pre-Processing

Figure 8A:
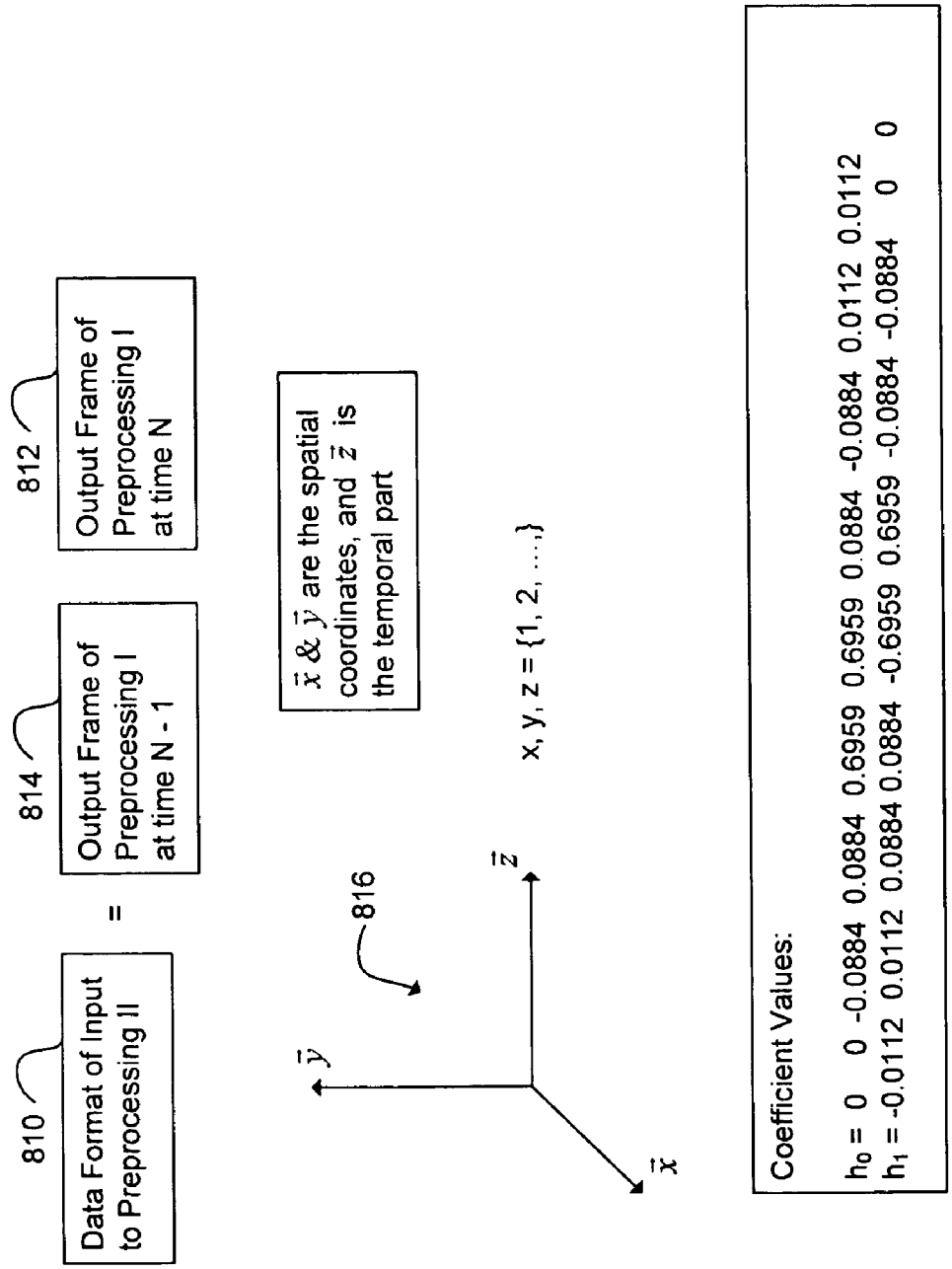
FIGS. 8A-8C are block diagrams illustrating a pre-processing pass II module shown in FIG. 5 according to one embodiment.
Figure 8B:
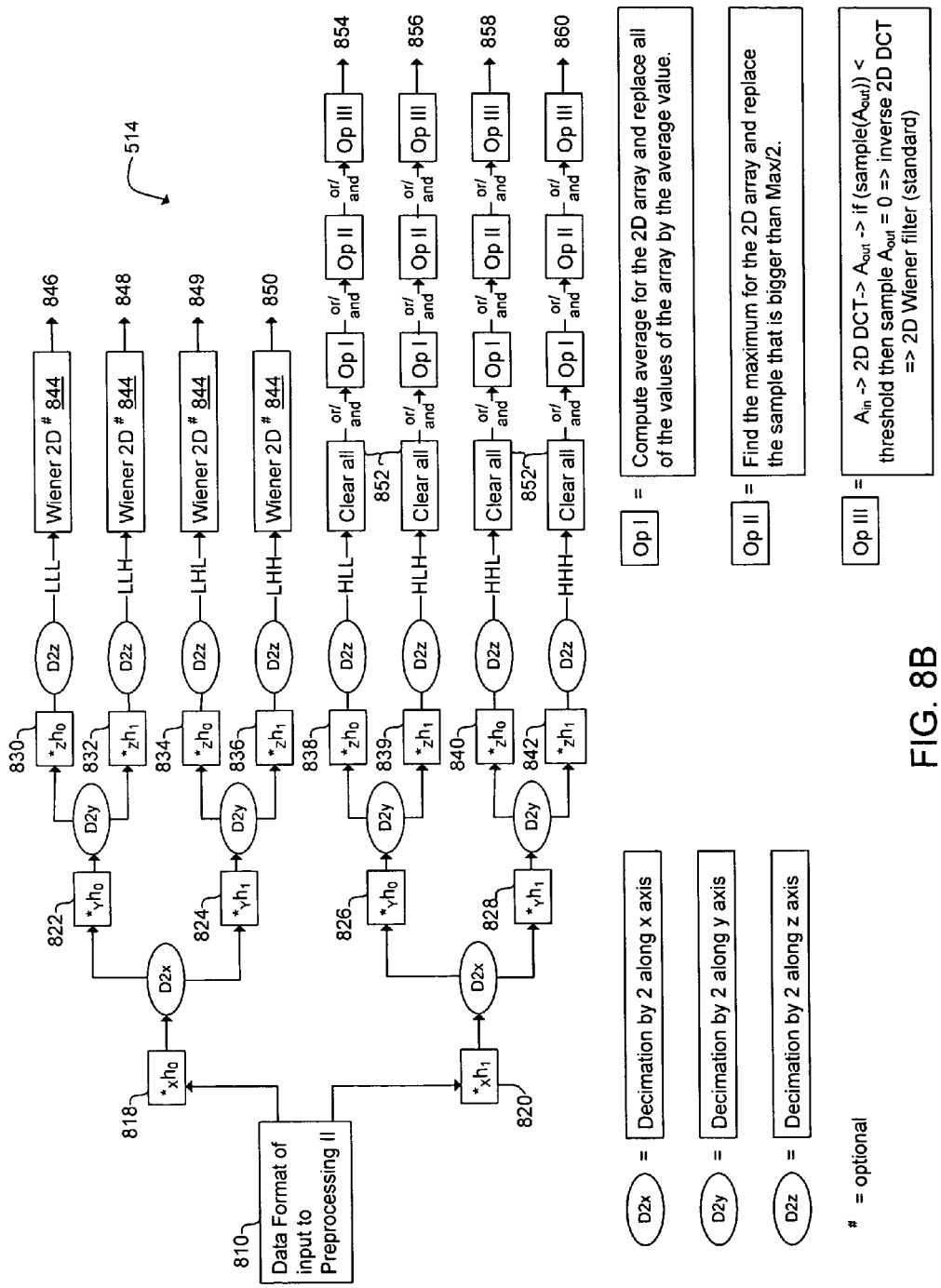
Figure 8C:
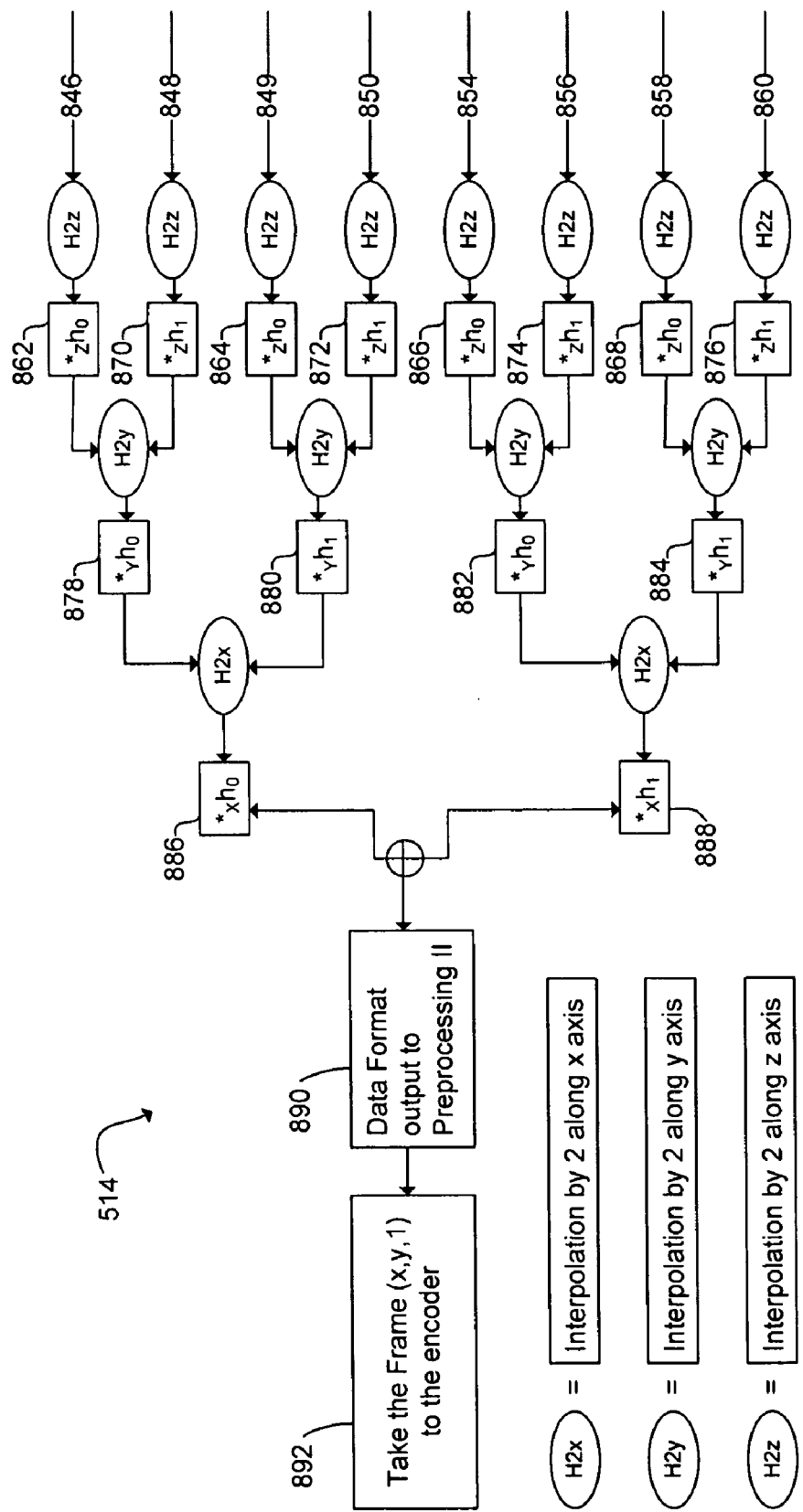

FIGS. 8A-8C are block diagrams illustrating the pre-processing pass II module 514 shown in FIG. 5 according to one embodiment. As discussed above, the pre-processing pass II module 514 is configured to delete high frequency data in the temporal domain so as to reduce variations between the two consecutive frames 516, 518 without disturbing the naturalness of the motion between consecutive frames.

FIG. 8A is a graphical representation of a data format of input 810 to the pre-processing pass II module 514 shown in FIG. 5. The data format of the input 810 comprises an output frame 812 of the pre-processing pass I module 510 at time N and an output frame 814 of the pre-processing pass I module 512 at time N−1. As shown in FIG. 8A, the output frames 812, 814 from the pre-processing pass I modules 510, 512 fill a three-dimensional array 816 of two buffers (not shown). The three-dimensional array 816 has an x-axis corresponding to a horizontal dimension, a y-axis corresponding to a vertical dimension, and a z-axis corresponding to a temporal dimension. FIG. 8A also shows coefficient values $h_0$ and $h_1$ used by filters discussed below with respect to FIGS. 8B-8C.

FIG. 8B-8C are block diagrams of the pre-processing pass II module 514 shown in FIG. 5. Referring to FIG. 8B, the data format of the input 810 to the pre-processing pass II module 514 is passed in parallel via a low-pass filter 818 and decimation by a factor of two along the x-axis (D2x), and via a high pass-filter 820 and decimation by a factor of two along the x-axis (D2x).

After decimation, the output of the filter 818 is passed in parallel via a low-pass filter 822 and decimation by a factor of two along the y-axis (D2y), and via a high pass-filter 824 and decimation by a factor of two along the y-axis (D2y). After decimation, the output of the filter 820 is passed in parallel via a low-pass filter 826 and decimation by a factor of two along the y-axis (D2y), and via a high pass-filter 828 and decimation by a factor of two along the y-axis (D2y).

After decimation, the output of the filter 822 is passed in parallel via a low-pass filter 830 and decimation by a factor of two along the z-axis (D2z), and via a high pass-filter 832 and decimation by a factor of two along the z-axis (D2z) to respectively produce intermediate array LLL (e.g., indicating low-pass filtering in the x, y, and z directions) and intermediate array LLH (e.g., indicating low-pass filtering in the x and y directions and high-pass filtering in the z direction). After decimation, the output of the filter 824 is passed in parallel via a low-pass filter 834 and decimation by a factor of two along the z-axis (D2z), and via a high pass-filter 836 and decimation by a factor of two along the z-axis (D2z) to respectively produce intermediate arrays LHL, LHH.

After decimation, the output of the filter 826 is passed in parallel via a low-pass filter 838 and decimation by a factor of two along the z-axis (D2z), and via a high pass-filter 839 and decimation by a factor of two along the z-axis (D2z) to respectively produce intermediate arrays HLL, HLH. After decimation, the output of the filter 828 is passed in parallel via a low-pass filter 840 and decimation by a factor of two along the z-axis (D2z), and via a high pass-filter 842 and decimation by a factor of two along the z-axis (D2z) to respectively produce intermediate arrays HHL, HHH.

The intermediate arrays LLL, LLH, LHL, LHH are then passed in parallel via two-dimensional Wiener filters 844 (four shown) to perform a noise reduction in the temporal domain. The Wiener filters 844 each operate on a combination of two spatial consecutive frames. The Wiener filters 844 respectively produce sub-arrays 846, 848, 849, 850. As shown in FIG. 8B, the Wiener filters 844 are optional in some embodiments.

The intermediate arrays HLL, HLH, HHL, HHH are passed in parallel via one or more of a clear operator 852 (four shown), an Op I module (the Operator I module discussed above), an Op II module (the Operator II module discussed above), and/or an Op III module (the Operator III module discussed above) to produce sub-arrays 854, 856, 858, 860. As discussed below, the clear operator 852 is optional. The pre-processing pass II module 514 uses the clear operator 852 when deinterlacing or to produce a low bit rate.

Referring to FIG. 8C, the sub-arrays 846, 849, 854, 858 are passed in parallel via up-sampling by a factor of two along the z-axis (H2z) to respective low-pass filters 862, 864, 866, 868. Similarly, the sub-arrays 848, 850, 856, 860 are passed in parallel via up-sampling by a factor of two along the z-axis (H2z) to respective high-pass filters 870, 872, 874, 876.

The outputs from the filters 862, 870 are added and the result is passed via up-sampling by a factor of two along the y-axis (H2y) to a low-pass filter 878. The outputs from the filters 864, 872 are added and the result is passed via up-sampling by a factor of two along the y-axis (H2y) to a high-pass filter 880. The outputs from the filters 866, 874 are added and the result is passed via up-sampling by a factor of two along the y-axis (H2y) to a low-pass filter 882. The outputs from the filters 868, 876 are added and the result is passed via up-sampling by a factor of two along the y-axis (H2y) to a high-pass filter 884.

The outputs from the filters 878, 880 are added and the result is passed via up-sampling by a factor of two along the x-axis (H2x) to a low-pass filter 886. The outputs from the filters 882, 884 are added and the result is passed via up-sampling by a factor of two along the x-axis (H2x) to a high-pass filter 888. The outputs from the filters 886, 888 are added to produce a data format of an output 890 of the pre-processing II module 514. As shown in FIG. 8C, from the two buffers of the three-dimensional array 816, a first buffer 892 is provided to the encoders 522, 524, 526, 528, 530 shown in FIG. 5.

In summary, the pre-processing II module 514 filters and decimates the uncompressed video frames in the input 810 comprising the three-dimensional array 816 to achieve eight intermediate arrays LLL, LLH, LHL, LHH, HLL, HLH, HHL, HHH, each of which consist of two buffers.

In one embodiment, the pre-processing II module 514 destroys the details of the original video frame 810 included in the intermediate arrays HLL, HLH, HHL, HHH using the clear operator 852 so as to delete large variations between the two consecutive frames of the input 810. This permits the pre-processing II module 514 to reconstruct a new frame (output 890) that includes smaller variations between the two frames in the point of view of motion vectors. The pre-processing II module 514 passes the intermediate arrays LLL, LLH, LHL, LHH through the Wiener 2D filters 844 to perform a noise reduction in the temporal domain.

In addition, or in another embodiment, the pre-processing II module 514 does not clear the intermediate arrays HLL, HLH, HHL, HHH. Thus, the intermediate arrays HLL, HLH, HHL, HHH can be passed through one or more of the Operator I module, the Operator II module, and/or the Operator III module. The choice to not clear the intermediate arrays HLL, HLH, HHL, HHH and to use one or more of the operator modules I, II, and/or III, is based on achieving a desired bit rate.

Motion Estimation

Figure 9:
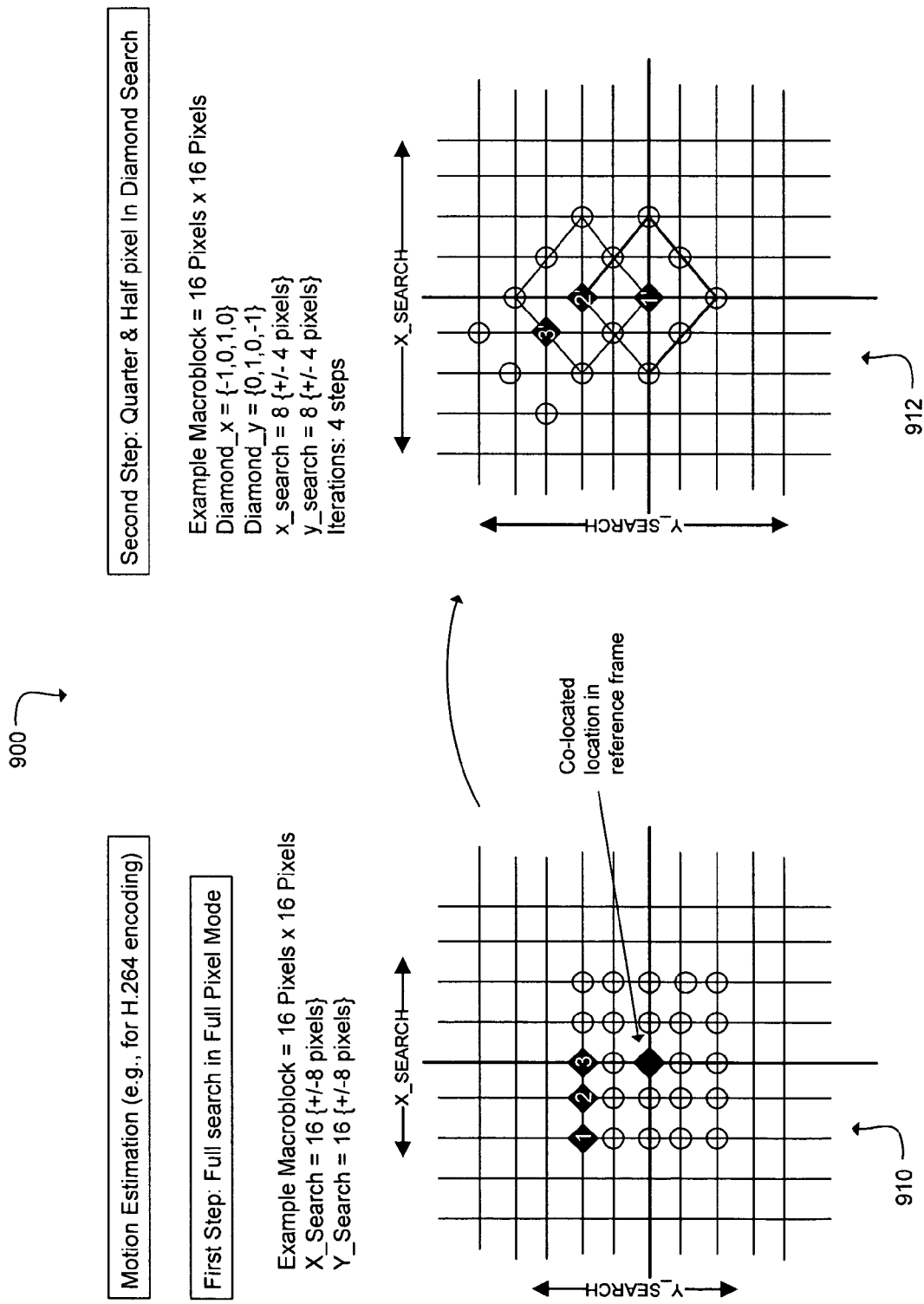
FIG. 9 graphically illustrates a motion estimation method for encoding a multimedia data stream according to one embodiment.

FIG. 9 graphically illustrates a motion estimation method 900 for encoding a multimedia data stream according to one embodiment. In video compression schemes (such as those that use interframe coding), motion estimation is generally one of the most computationally intensive tasks. The motion estimation method 900 illustrated in FIG. 9 and described below lowers computational costs by reducing the search area used during a macroblock comparison process. Further, in one embodiment, the motion estimation method 900 is near to full search full range at approximately 98%.

During the motion estimation method 900, an encoder (such as the encoders 522, 524, 526, 528, 530) generates motion vectors that define the displacement of macroblocks in a "current" frame with respect to macroblocks in a "reference" frame. In one embodiment, the encoder divides the current frame into macroblocks that are 16 pixels×16 pixels. An artisan will recognize from the disclosure herein that macroblocks having other sizes can also be used.

Generally, for a full search of a full range of pixels (referred to herein as "full search full range"), the encoder compares each of the macroblocks in the current frame to a macroblock in the reference frame using an error measure, and selects the best matching macroblock. Error measures may include, for example, sum of absolute differences (SAD); mean absolute error (MAE); minimum squared error (MSE).

In the motion estimation method 900, the encoder performs an integer level search 910 followed by a diamond search 912 in quarter and half pixel to further increase the search accuracy. In one embodiment, the integer level search 910 comprises a simple full search +/−8 pixels of the 16 pixels×16 pixels macroblock to provide a good similar macroblock match with a precision of +/−4 pixels. The quarter and half pixel diamond search 912 is not in the point of view to reduce computations. However, the encoder uses the diamond search 912 to find exactly (or with a high degree of precision) the best matched macroblock.

Further, by reducing variations between the two consecutive frames 516, 518 according to one embodiment, the pre-processing pass I modules 510, 512 and the pre-processing pass II module 514 shown in FIG. 5 allow the encoder to produce macroblocks that are more homogeneous such that they can be searched using less computations.

The integer level search 910 includes a full search motion estimation wherein all possible overlapping locations around the co-located macroblock in the reference frame are evaluated using a SAD error measure. The position that results in the minimum SAD error measure is used as a predictor provided to the diamond search 912 in the form of a motion vector.

As shown in FIG. 9, the search area in the reference frame is denoted as X_SEARCH (equal to 16 in this example embodiment) and Y_SEARCH (also equal to 16 in this example embodiment). Therefore, the number of SAD error measures (N) to be computed increases proportionally with the search area. For example, the equation below shows that the encoder will compute 256 SAD error measures N:

$$N = X\_SEARCH \times Y\_SEARCH = 16 \times 16 = 256.$$

If the optimum macroblock falls outside the search area, the integer level search 910 fails to find the optimum macroblock. In the embodiment shown in FIG. 9, the search area for the integer level search 910 is very low. Thus, the motion estimation method 900 includes the diamond search 912 in half and quarter pixel.

The diamond search 912 receives the motion vector give by the integer level search 910 (in precision of integer pixel). The diamond search 912 starts a first search in the co-located macroblock given by the full motion search described above, and calculates eight additional SAD error measures in a diamond pattern around a first center (denoted as 1' in FIG. 9) given by the integer level search 910.

Once the first search finds a first minimum SAD error measure location, the diamond center is displaced from the first center to a second center comprising the first minimum SAD error measure location (denoted as 2' in FIG. 9). Then, the diamond search 912 starts a second search in a diamond pattern around the second center. As shown in FIG. 9, the second search requires fewer SAD error measure computations because the diamond pattern around the second center includes locations in the diamond pattern around the first center. The diamond search 912 continues moving center locations and performing searches in diamond patterns until the position of the minimum SAD error measure is located in the center of a diamond, indicating the location of the best macroblock match.

If the motion estimation method 900 performs the diamond search 912 without performing the integer level search 910, there is a possibility that the motion estimation method 900 may miss an optimum matched macroblock near the center. However, as discussed above, the motion estimation method 900 combines the integer level search 910 and the diamond search 912 to arrive at approximately the same result as full search full range motion estimation.

It will be obvious to those having skill in the art that many changes may be made to the details of the above-described embodiments without departing from the underlying principles of the invention. The scope of the present invention should, therefore, be determined only by the following claims.

What is claimed is:

1. A method for reducing a bit rate in a multimedia data stream, the method comprising:
spatially filtering two consecutive frames of a first multimedia data stream, wherein spatially filtering comprises:
splitting a frame into a plurality of sub-frames each comprising a two-dimensional array of sample values, the two-dimensional array corresponding to the spatial dimensions of the frame; and
for at least a first sub-frame:
determining an average sample value for the first sub-frame; and
replacing all of the sample values in the first sub-frame with the average sample value;
temporally filtering and combining the two consecutive frames to produce a pre-processed frame;
encoding the pre-processed frame using a plurality of scalar quantization values to produce a plurality of encoded frames;

selecting one of the encoded frames to include in a second multimedia data stream, the selection based at least in part on the visual quality of the encoded frames; and for at least a second sub-frame:
determining a maximum sample value for the second sub-frame; and
replacing sample values in the second sub-frame that are greater than a predetermined portion of the maximum sample value with a replacement value that substantially equals the predetermined portion of the maximum sample value;
wherein the predetermined portion of the maximum sample value comprises approximately one-half the maximum sample value.

2. The method of claim 1, wherein the selection of one of the encoded frames for inclusion in the second multimedia data stream is further based at least in part on the size of the encoded frames.

3. The method of claim 2, wherein, if more than one of the encoded frames have a minimum size, the selection of one of the encoded frames for inclusion in the second multimedia data stream is further based at least in part on the smallest scalar quantization value used to encode the pre-processed frame.

4. The method of claim 1, wherein spatially filtering the two consecutive frames comprises spatially filtering the two consecutive frames in parallel.

5. The method of claim 1, further comprising reducing noise in the spatial domain in the second sub-frame.

6. The method of claim 5, wherein reducing noise in the spatial domain for at least the second sub-frame comprises:
transforming the second sub-frame to the frequency domain; and
removing frequency samples from the second sub-frame that are less than a frequency threshold.

7. The method of claim 6, wherein transforming comprises performing a discrete cosine transform on the second sub-frame.

8. The method of claim 7, further comprising:
performing an inverse discrete cosine transform on the second sub-frame; and
passing the second sub-frame through a two-dimensional Wiener filter.

9. The method of claim 1, wherein splitting the frame comprises:
low pass filtering and decimating the frame along a first spatial dimension;
high pass filtering and decimating the frame along the first spatial dimension;
low pass filtering and decimating the frame along a second spatial dimension; and
high pass filtering and decimating the frame along the second spatial dimension.

10. The method of claim 9, further comprising recombining the sub-frames by:
low pass filtering and interpolating the plurality of sub-frames along the second spatial dimension;
high pass filtering and interpolating the plurality of sub-frames along the second spatial dimension;
low pass filtering and interpolating the plurality of sub-frames along the first spatial dimension; and
high pass filtering and interpolating the plurality of sub-frames along the first spatial dimension.

11. The method of claim 1, wherein splitting the frame comprises splitting the frame into nineteen sub-frames.

12. The method of claim 1, wherein temporally filtering the two consecutive frames comprises:

creating a three-dimensional array comprising the spatially filtered two consecutive frames, a first and a second dimension of the three-dimensional array corresponding to spatial dimensions and a third dimension corresponding to a temporal dimension of the two consecutive frames; and
filtering and decimating the three-dimensional array along the first dimension, the second dimension, and the third dimension so as to split the three-dimensional array into a plurality of smaller arrays.

13. The method of claim 12, further comprising passing at least one of the plurality of smaller arrays through a Wiener filter to reduce noise in the temporal dimension.

14. The method of claim 12, further comprising performing a clear operation on one or more of the plurality of smaller arrays.

15. The method of claim 14, further comprising:
determining an average sample value for a selected smaller array of the plurality of smaller arrays; and
replacing all of the sample values in the selected smaller array with the average sample value.

16. The method of claim 14, further comprising:
determining a maximum sample value for a selected smaller array of the plurality of smaller arrays; and
replacing sample values in the selected smaller array that are greater than a predetermined portion of the maximum sample value with a replacement value that substantially equals the predetermined portion of the maximum sample value.

17. The method of claim 16, wherein the predetermined portion of the maximum sample value comprises approximately one-half the maximum value.

18. The method of claim 14, further comprising:
performing a discrete cosine transform on a selected smaller array of the plurality of smaller arrays;
removing samples from the selected smaller array that are less than a threshold value;
performing an inverse discrete cosine transform on the selected smaller array; and
passing the selected smaller array through a through a two-dimensional Wiener filter.

19. The method of claim 12, further comprising:
filtering and interpolating the plurality of smaller arrays along the first dimension, the second dimension, and the third dimension so as to recombine the plurality of smaller arrays to produce the pre-processed frame.

20. The method of claim 1, wherein the visual quality of the encoded frames is based at least in part on a peak signal-to-noise ratio (PSNR) score.

21. The method of claim 1, wherein encoding the pre-processed frame comprises:
dividing the pre-processed frame into a plurality of macroblocks;
performing motion estimation for each macroblock in the pre-processed frame, the motion estimation comprising:
searching overlapping locations around a co-located macroblock in a reference frame to determine a first estimated location having a minimum error measure at an integer pixel level; and
searching locations in a diamond pattern around the first estimated location to determine a second estimated location having a minimum error measure at a quarter and half pixel level.

22. The method of claim 21, further comprising searching quarter and half pixel level locations in a diamond pattern around the second estimated location to determine a third estimated location having a minimum error measure at the quarter and half pixel level.

23. The method of claim 21, wherein the error measure is a sum of absolute differences (SAD) between the macroblock in the pre-processed frame and the co-located macroblock in the reference frame.

24. A method for reducing a bit rate in a multimedia data stream, the method comprising:
   spatially filtering two consecutive frames of a first multimedia data stream, wherein spatially filtering comprises:
      splitting a frame into a plurality of sub-frames each comprising a two-dimensional array of sample values, the two-dimensional array corresponding to the spatial dimensions of the frame, wherein splitting the frame comprises:
         low pass filtering and decimating the frame along a first spatial dimension;
         high pass filtering and decimating the frame along the first spatial dimension;
         low pass filtering and decimating the frame along a second spatial dimension; and
         high pass filtering and decimating the frame along the second spatial dimension; and
      for at least a first sub-frame:
         determining an average sample value for the first sub-frame; and
         replacing all of the sample values in the first sub-frame with the average sample value;
   temporally filtering and combining the two consecutive frames to produce a pre-processed frame;
   encoding the pre-processed frame using a plurality of scalar quantization values to produce a plurality of encoded frames;
   selecting one of the encoded frames to include in a second multimedia data stream, the selection based at least in part on the visual quality of the encoded frames; and
   recombining the sub-frames by:
      low pass filtering and interpolating the plurality of sub-frames along the second spatial dimension;
      high pass filtering and interpolating the plurality of sub-frames along the second spatial dimension;
      low pass filtering and interpolating the plurality of sub-frames along the first spatial dimension; and
      high pass filtering and interpolating the plurality of sub-frames along the first spatial dimension.

25. A method for reducing a bit rate in a multimedia data stream, the method comprising:
   spatially filtering two consecutive frames of a first multimedia data stream;
   temporally filtering and combining the two consecutive frames to produce a pre-processed frame, wherein temporally filtering comprises:
      creating a three-dimensional array comprising the spatially filtered two consecutive frames, a first and a second dimension of the three-dimensional array corresponding to spatial dimensions and a third dimension corresponding to a temporal dimension of the two consecutive frames; and
      filtering and decimating the three-dimensional array along the first dimension, the second dimension, and the third dimension so as to split the three-dimensional array into a plurality of smaller arrays;
   encoding the pre-processed frame using a plurality of scalar quantization values to produce a plurality of encoded frames;
   selecting one of the encoded frames to include in a second multimedia data stream, the selection based at least in part on the visual quality of the encoded frames;
   performing a clear operation on one or more of the plurality of smaller arrays;
   determining an average sample value for a selected smaller array of the plurality of smaller arrays; and
   replacing all of the sample values in the selected smaller array with the average sample value.

26. A method for reducing a bit rate in a multimedia data stream, the method comprising:
   spatially filtering two consecutive frames of a first multimedia data stream;
   temporally filtering and combining the two consecutive frames to produce a pre-processed frame, wherein temporally filtering comprises:
      creating a three-dimensional array comprising the spatially filtered two consecutive frames, a first and a second dimension of the three-dimensional array corresponding to spatial dimensions and a third dimension corresponding to a temporal dimension of the two consecutive frames; and
      filtering and decimating the three-dimensional array along the first dimension, the second dimension, and the third dimension so as to split the three-dimensional array into a plurality of smaller arrays;
   encoding the pre-processed frame using a plurality of scalar quantization values to produce a plurality of encoded frames;
   selecting one of the encoded frames to include in a second multimedia data stream, the selection based at least in part on the visual quality of the encoded frames;
   performing a clear operation on one or more of the plurality of smaller arrays; and
   filtering and interpolating the plurality of smaller arrays along the first dimension, the second dimension, and the third dimension so as to recombine the plurality of smaller arrays to produce the pre-processed frame.

* * * * *